United States Patent [19]

Mennicke

[11] Patent Number: 5,484,900
[45] Date of Patent: Jan. 16, 1996

[54] 1:2 CHROMIUM COMPLEX DYESTUFFS

[75] Inventor: Winfried Mennicke, Leverkusen, Germany

[73] Assignee: Bayer Aktiengesellschaft, Leverkusen, Germany

[21] Appl. No.: 201,592

[22] Filed: Feb. 25, 1994

[30]   Foreign Application Priority Data

Mar. 4, 1993 [DE] Germany .................... 43 06 715.8

[51] Int. Cl.⁶ .................... C09B 45/16; C09B 67/22; D06P 3/32; D06P 3/06
[52] U.S. Cl. .................... 534/696; 534/581; 534/602; 8/437; 8/527; 8/641
[58] Field of Search .................... 534/696, 720, 534/725; 8/437

[56]        References Cited

U.S. PATENT DOCUMENTS

| | | | |
|---|---|---|---|
| 3,627,747 | 12/1971 | Brouard | 534/696 |
| 3,704,086 | 11/1972 | Bayew | 534/602 |
| 4,179,267 | 12/1979 | Lacroix et al. | 8/527 |
| 4,710,198 | 12/1987 | Beffa et al. | 534/696 X |
| 4,994,561 | 2/1991 | Joswig et al. | 534/582 |
| 4,996,303 | 2/1991 | Puntener et al. | 534/602 |
| 5,126,435 | 6/1992 | Joswig et al. | 534/582 |
| 5,250,671 | 10/1993 | Mennicke | 534/698 |

FOREIGN PATENT DOCUMENTS

| | | |
|---|---|---|
| 66230 | 5/1982 | European Pat. Off. . |
| 0450421 | 10/1991 | European Pat. Off. . |
| 740049 | 5/1943 | Germany . |
| 3544118 | 6/1986 | Germany . |
| 53-8622 | 1/1978 | Japan . |

OTHER PUBLICATIONS

Derwent Abstract: Textiles, Paper, Cellulose; p. 7, Week A01, J5–F; TKAG, F06, 01250A/01, J52138–526; "Azo dye chromium complex prodn . . . ", Taoka Kagaku Kogyo KK, Apr. 19, 1976, JA–045153.

Derwent Abstract: Textiles, Paper, Cellulose; p. 2, Week A10, J5–F; TKAG, F06, 18590A/10, J53008–622; "Chrome chelate dye prepn . . . ", Taoka Kagaku Kogyo KK, Jul. 13, 1976, JA–083754.

Kawasaki et al, Chemical Abstracts, 88:192742e (1978).

Chemical Abstracts, Chemical Substance Index, vol. 88, 1978, p. 1362CS.

Kawasaki et al, Chemical Abstracts, 88:106743b (1978).

Chemical Abstracts, Registry Handbook, 1993 Supplement, part 3, Registry No. 149564–65–8, p. 3686RV.

Primary Examiner—Robert W. Ramsuer
Assistant Examiner—Fiona T. Powers
Attorney, Agent, or Firm—Sprung Horn Kramer & Woods

[57]          ABSTRACT

1:2 chromium complex dyestuffs of the formula (I)

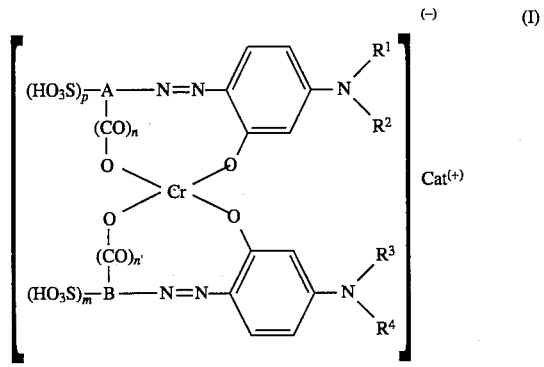

in which A, B, $R^1$, $R^2$, $R^3$, $R^4$, p, m, n, n' and $Cat^{(+)}$ have the meaning given in the description, are suitable for dyeing and printing amido-containing materials.

3 Claims, No Drawings

1:2 CHROMIUM COMPLEX DYESTUFFS

In leather dyeings the stability to PVC migration is frequently insufficient. This is a defect which can be observed increasingly in the colour range from bordeaux to blue. Thus, for example, the highly water soluble 1:2 chromium complex dyestuff having two sulpho groups, C.I. Acid Blue 193, 15707, gives blue leather dyeings exhibiting unsatisfactory migration fastness.

It has now been found that the bordeaux to blue metal complex dyestuffs described below, in particular if they have two sulpho groups, give level leather dyeings having excellent stability to PVC migration and moreover show good compatibility with a number of other migration fast metal complex dyestuffs.

The present invention relates to novel 1:2 chromium complex dyestuffs, to their solutions and to the use of the novel 1:2 chromium complex dyestuffs and their solutions for dyeing amido-containing materials.

The novel 1:2 chromium complex dyestuffs have the formula (I)

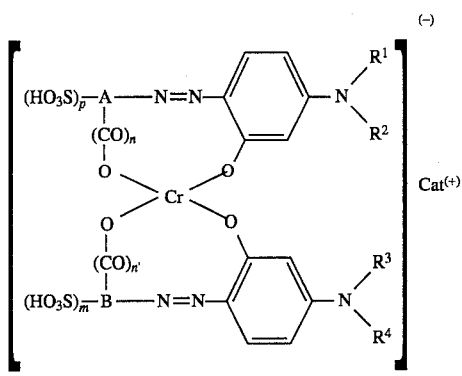

in which
A and B, independently of one another, represent the radical of a benzene or naphthalene ring each of which is substituted or unsubstituted, the complexing group being in each case in the o position relative to the azo group, and $R^1$, $R^2$, $R^3$ and $R^4$, independently of one another, represent hydrogen, alkyl, aryl or aralkyl, n, n', p and m, independently of one another, are 0 or 1, the sum of p and m being 1 or 2, and $Cat^{(+)}$ represents a cation.

Preferred alkyl groups are those having 1 to 4 C atoms, which, if desired, may be further substituted, for example by Cl, CN or $C_1$–$C_4$-alkoxy.

Aralkyl is preferably aryl-$C_1$–$C_2$-alkyl and aryl is preferably optionally substituted phenyl, suitable substituents being Cl, Br, $NO_2$, $C_1$–$C_4$-alkyl and $C_1$–$C_4$-alkoxy.

The cation represented by the symbol $Cat^{(+)}$ is preferably an alkali metal ion, in particular a lithium ion, sodium ion or potassium ion, an ammonium ion or an ammonium ion which is mono-, di-, tri- or tetrasubstituted by lower alkyl.

Suitable substituents in rings A and B are preferably: acylamino, in particular acetylamino, alkyl, in particular methyl, alkoxy, in particular methoxy, sulphamoyl which is unsubstituted or mono- or disubstituted by alkyl or aryl, in particular N-methyl-, N-phenyl- or N,N-diethylsulphamoyl, alkylsulphonyl, in particular methylsulphonyl, arylsulphonyl, in particular phenylsulphonyl, Cl or $NO_2$.

The 1:2 chromium complex dyestuffs of the formula (I) are preferably present in a purity of at least 90%, preferably 90 to 95%.

Preferred dyestuffs are those of the formula (I) in which $R^1$, $R^2$, $R^3$ and $R^4$, independently of one another, represent $C_1$–$C_4$-alkyl.

A prefered selection of dyestuffs of the formula (I) is made up of the symmetrical 1:2 chromium complex dyestuffs of the formula (II)

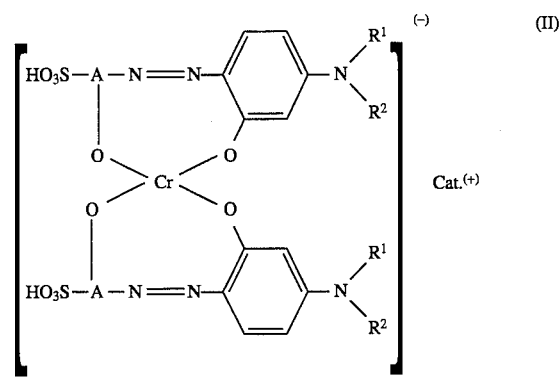

in which
A and $Cat^{(+)}$ have the same meaning as in formula (I), and
$R^1$ and $R^2$, independently of one another, represent $C_1$–$C_4$-alkyl.

The symmetrical and unsymmetrical 1:2 chromium complex dyestuffs of the formula (I) can be prepared by methods known per se, a) by converting a monoazo dyestuff of the formula (III)

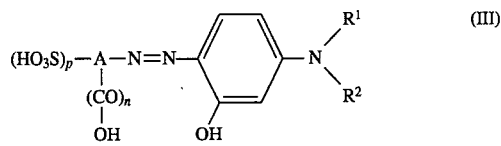

in which
A, p, n, $R^1$ and $R^2$ have the general and preferred meaning given for formula (I),
or a monoazo dyestuff of the formula (IV)

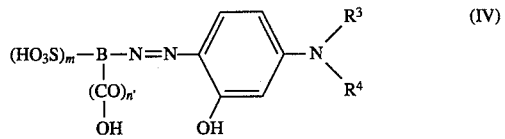

in which
B, m, n', $R^3$ and $R^4$ have the general and preferred meaning given for formula (I),
into the corresponding symmetrical 1:2 chromium complex dyestuff by reaction with a chromium donor, b) by metallizing a mixture of one monoazo dyestuff each of the formula (III) and (IV) under the same conditions as in a) with a chromium donor to give a mixture of the two symmetrical 1:2 chromium complex dyestuffs and the unsymmetrical 1:2 chromium complex dyestuff. In this method, the molar ratio of the two different dyestuffs to be metallized can vary within wide limits, for example from a ratio of 1:9 to a ratio of 9:1. And finally c) by converting an azo dyestuff of the formula (III) or (IV) into the corresponding 1:1 chromium complex by reaction with a chromium donor, and forming an adduct of this complex with a metal-free dyestuff of the formula (IV) or (III) to give in both cases a uniform unsymmetrical 1:2 chromium complex dyestuff.

The present invention furthermore relates to mixtures of the 1:2 chromium complex dyestuffs of the formula (I), in particular to those mixtures of the symmetrical 1:2 chromium complex dyestuffs and of the unsymmetrical 1:2 chromium complex dyestuff obtainable by the method described under b).

The azo compounds of the formulae (III) and (IV) can be obtained in a known manner by coupling diazotized amines of the formulae (V) and (VI), respectively

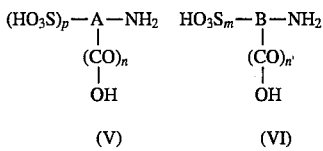

onto N-substituted m-aminophenols of the formula (VII) and (VIII), respectively

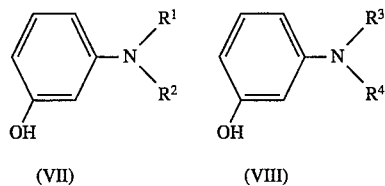

the substituents A, B, $R^1$, $R^2$, $R^3$, $R^4$ and the indices p, m, n and n' in the abovementioned formulae having the meanings given for formula (I).

Examples of amines of the formulae (V) and (VI) include: 2-aminobenzoic acid, 2-aminobenzoic acid-4- or -5-sulphonic acid, 2-aminobenzoic acid-4- or -5-sulphonamide, 4-, 5- or 5-chloro-2-aminobenzoic acid, 4- or 5-nitro-2-aminobenzoic acid, 2-aminophenol, 4- or 5-chloro- 2-aminophenol, 4,6-dichloro-2-aminophenol, 4- or 5-nitro-2-aminophenol, 4,6-dinitro-2-aminophenol, 4-chloro-, 4-methyl- or 4-acetamino-6-nitro-2-aminophenol, 6-chloro-, 6-methyl- or 6-acetamino-4-nitro-2-aminophenol, 6-acetamino-4-chloro-2-aminophenol, 4-chloro-5-nitro-2-aminophenol, 4- or 5-methyl-2-aminophenol, 4-methoxy-2-aminophenol, 2-aminophenol-4- or -5-sulphonic acid, 2-amino-4- or -5-methylsulphonylphenol, 2-amino-4- or -5-phenylsulphonylphenyl, 2-aminophenol-4- or -5-sulphonamide 2-aminophenol-4- or -5-sulphanilide, 2-amino-4-methyl-, -4-nitro-, -4-chloro-or -4-acetaminophenol-6-sulphonic acid, 2-amino-6-nitro-, -6-chloro- or -6-acetaminophenol-4-sulphonic acid, 4-nitro-2-aminophenol-5-sulphonic acid, 4-nitro-2-aminophenol-5- or -6-sulphonamide, 5-nitro-2-aminophenol-4-sulphonic acid, 4-methyl-2-aminophenol-5-sulphonic acid, 1-amino-2-hydroxynaphthalene-4-, -5-, -6-, -7- or -8-sulphonic acid, 2-amino-1-hydroxynaphthalene-4-sulphonic acid, 1-amino-2-hydroxy-6-nitro- or -6-acetaminonaphthaline-4-sulphonic acid.

Examples of suitable m-aminophenols of the formula (VII) and (VIII) are: m-aminophenol, N,N-dimethyl -, N,N-diethyl-, N,N-dipropyl- or N,N-dibutyl-m-aminophenol, N-ethyl-, N-phenyl- or N-benzyl-m-aminophenol, N-phenyl-N-ethyl-m-aminophenol.

The yields of the azo dyestuffs of the formula (III) or (IV) can be significantly increased by carrying out the coupling reaction in an inert gas atmosphere. Accordingly, the present invention provides a process for preparing azo dyestuffs of the formula (III)

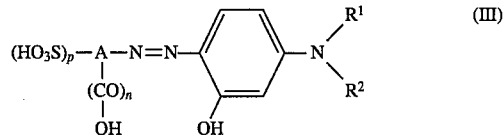

in which A, p, n, $R^1$ and $R^2$ have the meanings given for formula (I), characterized in that a diazotized amino of the formula (V) is coupled in an inert gas atmosphere at temperatures of 10° to 50° C., preferably 20° to 30° C., in aqueous medium, where appropriate in the presence of an organic water-miscible solvent, at a pH of 8 to 12, preferably 10 to 11, onto a compound of the formula (VII).

Preferred inert gases are nitrogen and argon and preferred solvents are carboxamides, such as N-methylpyrrolidone, glycols, such as ethylene glycol or propylene glycol, and mono-$C_1$–$C_4$-alkyl ethers thereof, such as ethylglycol or 1-ethoxy-2-propanol. The process according to the invention is preferably used for preparing coupling products from 1-diazo-6-nitro-2-naphthol-4-sulphonic acid or 1-diazo-2-naphthol-4-sulphonic acid and amines of the formula (VII). In this case, coupling under an inert gas atmosphere gives almost quantitative yields.

The prior art has already disclosed processes for preparing azo dyestuffs by coupling under an inert gas atmosphere, in which, however, fairly large amounts of sodium chloride and/or potassium chloride, zinc salts or ammonium salts always have to be present (see U.S. Pt. No. 4,996,303; EP-A 0,320,446; EP-A 0,320,447).

Conversion of the azo compounds of the formula (III) or (IV) into the symmetrical 1:2 chromium complex dyestuffs or conversion of a mixture of azo compounds of the formula (III) and (IV) into mixtures of an unsymmetrical and its two symmetrical 1:2 chromium complex dyestuffs is effected by means of chromium donors, if necessary in the presence of alkaline reagents, at a pH of 4 to 10, preferably 5 to 8. and at temperatures of 80° to 145° C., preferably 100° C. Suitable metal donors are mainly the chromium salts of inorganic or organic acids, for example chromium chloride, chromium fluoride, chromium sulphate, chromium acetate, chromium formate, potassium chromium sulphate, or ammonium chromium sulphate, chromosalicylic acid, furthermore chromium trioxide and sodium chromate or bichromate or potassium chromate or bichromate.

Conversion of the azo compounds of the formula (III) or (IV) into the 1:1 chromium complexes is usually effected by means of salts of trivalent chromium, such as, for example, chromium fluoride, chromium chloride, chromium sulphate or chromium formate, in aqueous medium at the boiling temperature or, where appropriate, higher temperatures of up to 145° C.

The subsequent reaction of a 1:1 chromium complex thus prepared with a metal-free azo compound of the formula (IV) or (III) is advantageously carried out in a weakly acidic to weakly alkaline medium at room temperature or a higher temperature of up to 120° C., preferably in the range from 50° to 100° C. The acid liberated on adduct formation of the metal-free azo compound with the metal-free azo compound with the 1:1 chromium complex is bound by the addition of alkaline reagents with maintenance of the abovementioned pH range.

Examples of suitable alkaline reagents are the hydroxides and carbonates of alkali metals, such as lithium hydroxide or carbonate, sodium hydroxide or carbonate or potassium hydroxide or carbonate, ammonia, or the ammonium hydroxides which are mono-, di-, tri- or tetrasubstituted by lower alkyl, such as mono-, di- or triethylammonium hydroxide, mono-, di- or tri(2-hydroxyethyl)ammonium hydroxide or tetramethylammonium hydroxide.

In order to accelerate the reaction, the reactions described here to give the symmetrical and unsymmetrical 1:2 chromium complex compounds can also be carried out in the presence of hydrotropic agents, such as, for example, urea or 6-caprolactam, or in the presence of organic solvents. Examples of suitable solvents are lower alcohols, such as ethanol, ketones, such as ethyl methyl ketone, carboxamides, such as formamide, dimethylformamide, N-methylpyrrolidone, glycols, such as ethylene glycol, propylene glycol, or preferably mono-$C_1$–$C_4$-alkyl ethers thereof, such as ethylglycol, 1-ethoxy-2-propanol.

At the end of the reaction, the symmetrical and unsymmetrical 1:2 chromium complex dyestuffs of the formula (I)

are present as the salt of the complex acid and the SO$_3$H groups attached thereto with the abovementioned alkaline reagents, for example as alkali metal salts when alkali metal hydroxides or carbonates are used or as ammonium salts when ammonia, mines or tetraalkylammonium hydroxides are used or as a mixed salt of the cations mentioned. Preferred salts are the lithium salts or the mixed lithium salts and sodium salts.

The symmetrical and unsymmetrical 1:2 chromium complex dyestuffs of the formula (I) according to the invention thus prepared can be isolated by salting out with alkali metal salts or evaporation on a roll or spray-dyeing and processed using customary standardizing agents to give water-soluble preparations or liquid dyestuff preparations.

The present invention furthermore provides liquid dyestuff preparations containing, in addition to customary additives, at least one 1:2 chromium complex dyestuff of the formula (I). Preferably, the liquid dyestuff preparations according to the invention are aqueous solutions containing, if desired, one or more organic solvents and/or hydrotropic compounds.

The organic solvents present in the liquid dyestuff preparations according to the invention are preferably those which are miscible with water in any ratio and, of these, in particular those which boil above 70° C. Examples of suitable solvents are cited in German Auslegeschrift 1,619,357 and German Offenlegungsschrift 2,335,512. Preferred solvents of this type contain amido groups, such as formamide, dimethylformamide, dimethylacetamide, N,N,N',N'-tetramethylurea, N-methylpyrrolidone, 1,3-dimethylpyrrolidone, or are glycols and glycol ethers, such as ethylene glycol, diethylene glycol or triethylene glycol, 1,2-propylene glycol, dipropylene glycol or tripropylene glycol, ethylene glycol monomethyl ether, ethylene glycol monoethyl ether, ethylene glycol monopropyl ether or ethylene glycol monoisopropyl ether, diethylene glycol monomethyl ether, diethylene glycol monoethyl ether, diethylene glycol monopropyl ether or diethylene glycol monoisopropyl ether, triethylene glycol monomethyl ether or triethylene glycol monoethyl ether, 1-methoxy-, 1-ethoxy-, 1-propoxy- or 1-isopropoxy-2-propanol, 2-methoxy-, 2-ethoxy-, 2-propoxy- or 2-isopropoxy-1-propanol, dipropylene glycol monomethyl ether or dipropylene glycol monoethyl ether, tripropylene glycol monomethyl ether or tripropylene glycol monoethyl ether.

Very particular preference is given to 1-ethoxy-2-propanol.

Suitable hydrotropic compounds are the compounds already mentioned above. Particularly suitable compounds are solid hydrotropic compounds such as urea, 6-caprolactam and N-methylcaprolactam.

Preferred liquid dyestuff preparations are composed of:

(a) 5 to 30% by weight of at least one symmetrical or unsymmetrical 1:2 chromium complex dyestuff of the formula (I), (b) 20 to 95% by weight of water, (c) 0 to 70% by weight of one or more organic solvents which are miscible with water in any ratio, and (d) 0 to 20% by weight of a hydrotropic compound.

In the liquid dyestuff preparations according to the invention, the 1:2 chromium complex dyestuffs are preferably present as lithium salts or as mixed lithium salts and sodium salts of the complex acids and of the SO$_3$H groups attached thereto.

Preparation of the liquid dyestuff preparations according to the invention can be easily achieved by stirring the pastes obtained by filtration or the powders obtained by evaporation or spray-dyeing in the abovementioned media at room temperature or temperatures of up to 100° C., preferably at 40° to 80° C. This is followed by a clarifying filtration, preferably at room temperature. To increase the shelf life, the electrolytes of the dyestuff solutions thus obtained can be separated off by membrane separation methods, for example by ultrafiltration or reverse osmosis, preferably at 5 to 40 bar. To this end, the aqueous dyestuff solution is preferably subjected to the membrane separation method, during which it is, if desired, concentrated, and the resulting low-electrolyte dyestuff-containing concentrate is then adjusted to the desired dyestuff strength by addition of water or one or more organic solvents and/or hydrotropic solid compounds.

However, in most cases the 1:2 chromium complex dyestuff of the formula (I) need not be isolated by salting out, evaporation or spray-dyeing and then dissolved again. Very frequently, the abovementioned chroming process already produces solutions of 1:2 chromium complex dyestuffs which, with respect to concentration and stability, already fulfil the requirements of liquid formulations.

The solid and liquid preparations of the symmetrical and unsymmetrical 1:2 chromium complex dyestuffs of the formula (I) are suitable for dyeing and printing substrates which are dyeable with anionic dyestuffs, in particular substrates of amido-containing materials, such as wool, silk, leather, pelts, polyamide and polyurethane fibres. The preferred area of application for the solid preparations is the dyeing and printing of leather and pelts, and for the liquid preparations the dyeing and printing of wool, silk, leather, pelts, polyamide and polyurethane fibres.

The leather substrates can be dyed with the 1:2 chromium complex dyestuffs of the formula (I) by various methods known per se. The solid preparations are predominantly suitable for dyeing in a drum, while the liquid preparations, apart from being suitable for drum dyeing, are also suitable for dyeing on continuous dyeing machines, for colouring seasonings and scutching liquors and in particular for spray-dyeing with or without seasoning. The leather substrates include any desired types of leather, in particular grained leather, velour leather, split velour, suede leather, Nubuk leather from various origins, in particular from cow, calf, goat, pig, sheep. The leathers can have been tamed by any desired method, for example by vegetable, mineral, synthetic taming or a combination thereof and additionally retanned with customary, in particular vegetable, mineral or synthetic, tanning materials.

The various methods of tanning with tanning materials of different anionic character result in leathers exhibiting a wide range of different affinities for anionic dyestuffs. The dyestuffs of the formula (I) show good exhaustion even onto leathers having less affinity for dyestuffs, preferably from an aqueous bath under the temperature and pH conditions known per se. They produce level dyeings and exhibit good build-up properties with increasing availability of dyestuff without producing undesirable bronzing effects.

The dyeings produced on the abovementioned substrates are in the red to blue range of hues and are light fast and wet fast. Apart from good lightfastness and perspiration fastness, the leather dyeings are distinguished in particular by good diffusion fastness.

A further advantage of the 1:2 chromium complex dyestuffs of the formula (I) and mixtures thereof, in particular mixtures thereof obtained by mixed chroming in accordance with method b), is their good compatibility with known dyestuffs, such as, for example, the usually brown dyestuffs from German Offenlegungsschrift 3,121,923 as described thereunder formula (I), the red dyestuffs from EP-A 532,994 or the yellow dyestuffs of the formula (IX)

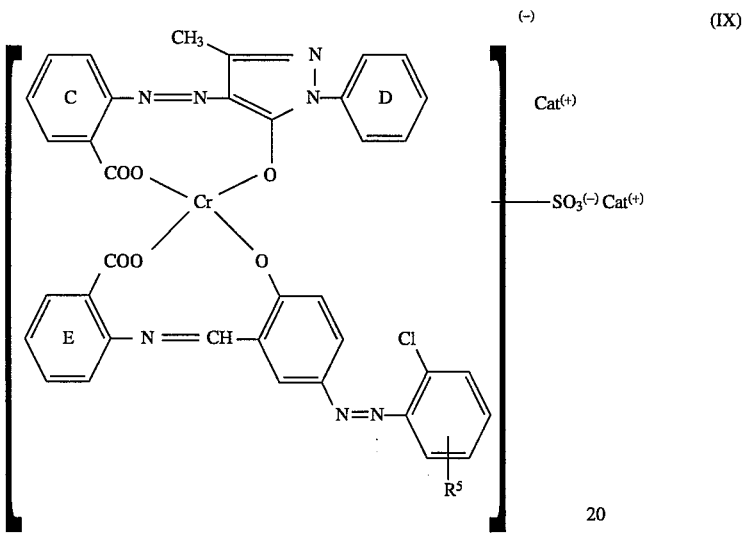

in which $R^5$ represents hydrogen, Cl, $OCH_3$, $SO_2NH_2$ or $CH_3$ and $Cat^{(+)}$ represents a cation, the $SO_3^{(-)}Cat^{(+)}$ group is attached to ring C, D or E, and rings C and D are unsubstituted or mono- to trisubstituted by identical or different substituents from the group consisting of Cl, $NO_2$, $CH_3$, aminosulphonyl, $C_1$–$C_4$-(di)-alkylaminosulphonyl or $C_1$–$C_4$-alkyl carbonylamino.

The yellow dyestuffs of the formula (IX) form the subject-matter of a prior German Application No. P 4,224,558 filed by this applicant.

The good compatibility results in a favourable effect especially when leather is dyed. Thus, with dyestuff mixtures of this type, differences in dyestuff availability, application and type of leather do not lead to any significant deviation in shade, and virtually no difference in colour can be observed between the surface and the layers underneath when the dyed leathers are buffed.

This constancy in shade is of interest in particular with green dyeings. Accordingly, the present invention also provides green- to olive-dyeing mixtures containing a blue dyestuff of the formula (X)

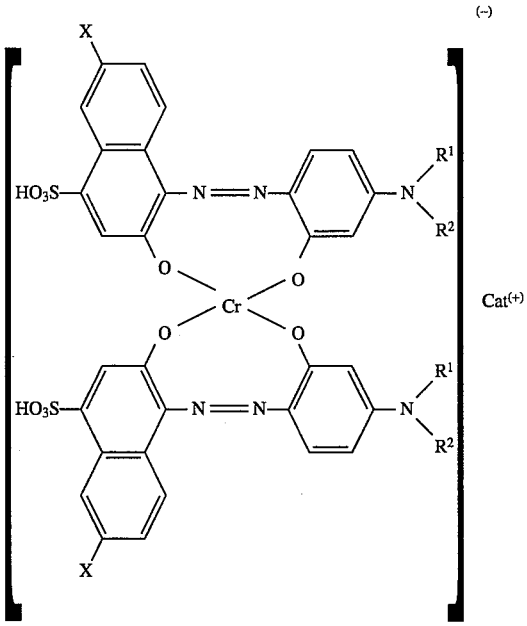

in which $R^1$, $R^2$ and $Cat^{(+)}$ have the same meanings as given for formula (I), and X represents hydrogen or nitro,
and a yellow dyestuff of the formula (IX).

The good compatibility of the blue dyestuffs of the formula (X) not only with the yellow dyestuffs of the formula (IX) but also with the red dyestuffs of the formula (XI) described in EP-A 532,994

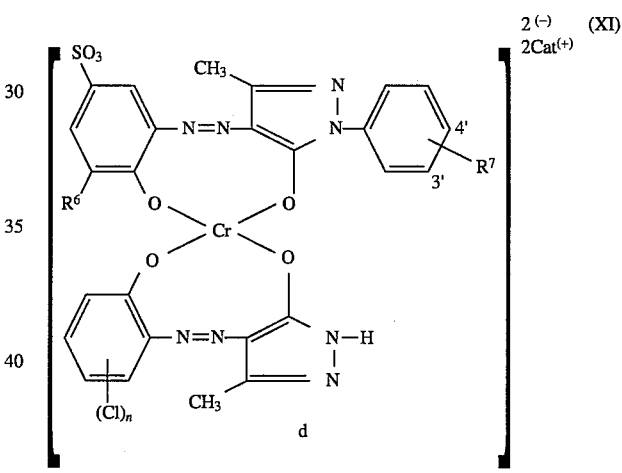

in which $R^6$ represents hydrogen, chlorine or nitro, $R^7$ represents alkyl which is attached to the phenyl ring in the 3' or 4' position, n represents 1 or 2, and $Cat^{(+)}$ represents a cation, makes it possible also to dye with mixtures of three dyestuffs in the primary colours yellow, red and blue. The preparation of suck mixtures produces a trichromatic colour system, makes it possible to obtain a wide range of hues, depending on the relative amount of the three components.

Especially the broom hues, which are frequently used in the leather industry, can be obtained using this system in a wide variety of shades.

Accordingly, the present invention also provides dyestuff mixtures containing a blue dyestuff of the formula (X), a yellow dyestuff of the formula (IX) and a red dyestuff of the formula (XI) and a process for the trichromatic dyeing of leather with the three-component mixture mentioned.

JP-52-138,526 and JP-53-08,622 has already disclosed processes for preparing 1:2 chromium complex dyestuffs by reaction of two specified azo dyestuffs with a chroming reagent. In both cases, mixtures consisting of the two symmetrical chromium complex dyestuffs and the unsymmetrical chromium complex dyestuff are obtained.

In German Patent DRP 740,049, a process for preparing metal-containing dyestuffs some of which are derived from azo dyestuffs of the formula (III) and (IV) is described. However, chroming of these dyestuffs gives the corresponding 1:1 chromium complex dyestuffs whose property profile is different from that of the 1:2 chromium complex dyestuffs of the formula (I).

EXAMPLES

Example 1

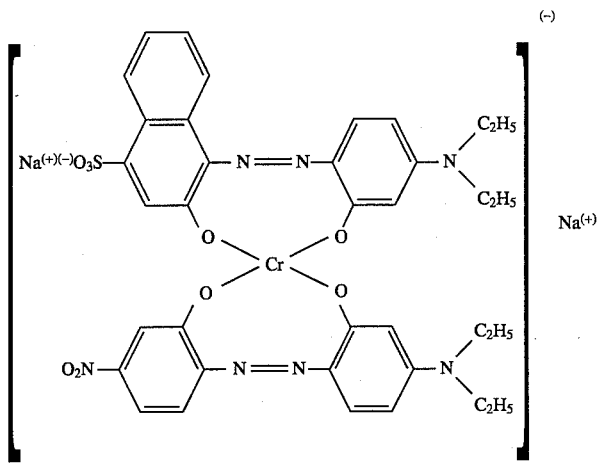

0.1 mol of the 1:1 chromium complex of the dyestuff obtained from 1-diazo-2-naphthol-4-sulphonic acid and 3-(N,N-diethylamino)phenol and 0.1 mol of the dyestuff obtained from diazotized 5-nitro-2-aminophenol and also 3-(N,N-diethylamino)phenol are introduced into 500 ml of water and thoroughly mixed with one another by stirring. The pH is brought to 7.5 by addition of 5N sodium hydroxide solution, and the temperature is raised to 80° C. over a period of about 45 minutes by heating the mixture, during which the pH is maintained at 7.5 to 8.0 by further dropwise addition of 5N sodium hydroxide solution. Upon reaching 80° C., a deep blue solution is formed, which is stirred at a pH of 7.5 to 8.0 and 80° C. for about another hour until the two starting compounds have been completely converted to the 1:2 chromium mixed complex. The water is separated off in a rotary evaporator to give a black powder which dyes wool, polyamide and leather in a blue shade having good fastness properties.

Examples 2 to 14

The procedure as described in Example 1 is repeated, except that the 1:1 chromium complexes of the azo dyestuffs (1) listed in column 2 of Table 1 below and stoichiometric amounts of the azo dyestuffs (2) shown in column 3 are used as the metal-free reactants, to give valuable 1:2 chromium complex dyestuffs which dye wool, polyamide and leather in bordeaux to blue shades having good fastness properties. The hue of the dyes is shown in column 4.

TABLE 1

| Ex. No. | Azo dyestuff (1) | Azo dyestuff (2) | Hue |
|---|---|---|---|
| 2 | 4-[(2-hydroxy-4-(diethylamino)phenyl)azo]-3-hydroxynaphthalene-1-sulfonic acid | 5-chloro-2-[(4-(diethylamino)-2-hydroxyphenyl)azo]-4-nitrophenol derivative | blue |
| 3 | 4-[(2-hydroxy-4-(diethylamino)phenyl)azo]-3-hydroxynaphthalene-1-sulfonic acid | 2-[(2-hydroxy-4-(phenylamino)phenyl)azo]-5-nitrophenol | blue |
| 4 | 4-[(2-hydroxy-4-(diethylamino)phenyl)azo]-3-hydroxynaphthalene-1-sulfonic acid | 4-chloro-2-[(4-(diethylamino)-2-hydroxyphenyl)azo]phenol | violet |
| 5 | 4-[(2-hydroxy-4-(diethylamino)phenyl)azo]-3-hydroxynaphthalene-1-sulfonic acid | 4,6-dichloro-2-[(4-(diethylamino)-2-hydroxyphenyl)azo]phenol | violet |
| 6 | 4-[(2-hydroxy-4-(diethylamino)phenyl)azo]-3-hydroxynaphthalene-1-sulfonic acid | 3-[(4-(diethylamino)-2-hydroxyphenyl)azo]-4-hydroxybenzenesulfonamide | violet |
| 7 | 4-[(2-hydroxy-4-(diethylamino)phenyl)azo]-3-hydroxynaphthalene-1-sulfonic acid | 3-[(4-(diethylamino)-2-hydroxyphenyl)azo]-2-hydroxy-5-nitrobenzenesulfonic acid | violet |

TABLE 1-continued

| Ex. No. | Azo dyestuff (1) | Azo dyestuff (2) | Hue |
|---|---|---|---|
| 8 | (naphthalene with NO₂, HO₃S, OH, N=N to phenyl with OH and N(C₂H₅)₂) | O₂N-phenyl(OH)-N=N-phenyl(HO)-N(C₂H₅)₂ | blue |
| 9 | (naphthalene with NO₂, HO₃S, OH, N=N to phenyl with OH and N(C₂H₅)₂) | Cl, O₂N-phenyl(OH)-N=N-phenyl(HO)-N(C₂H₅)₂ | blue |
| 10 | (naphthalene with NO₂, HO₃S, OH, N=N to phenyl with OH and N(C₂H₅)₂) | Cl-phenyl(OH)-N=N-phenyl(HO)-N(C₂H₅)₂ | violet |
| 11 | NO₂, HO₃S-phenyl(OH)-N=N-phenyl(HO)-N(C₂H₅)₂ | NO₂-phenyl(OH)-N=N-phenyl(HO)-N(C₂H₅)₂ | bordeaux |
| 12 | SO₃H, O₂N-phenyl(OH)-N=N-phenyl(HO)-N(C₂H₅)₂ | Cl-phenyl(OH)-N=N-phenyl(HO)-N(C₂H₅)₂ | violet |
| 13 | NO₂, HO₃S-phenyl(OH)-N=N-phenyl(HO)-N(C₂H₅)₂ | HO₂S-phenyl(COOH)-N=N-phenyl(HO)-N(C₂H₅)₂ | bordeaux |
| 14 | SO₃H, O₂N-phenyl(OH)-N=N-phenyl(HO)-N(C₂H₅)₂ | phenyl(COOH)-N=N-phenyl(HO)-N(C₂H₅)₂ | bordeaux |

Example 15

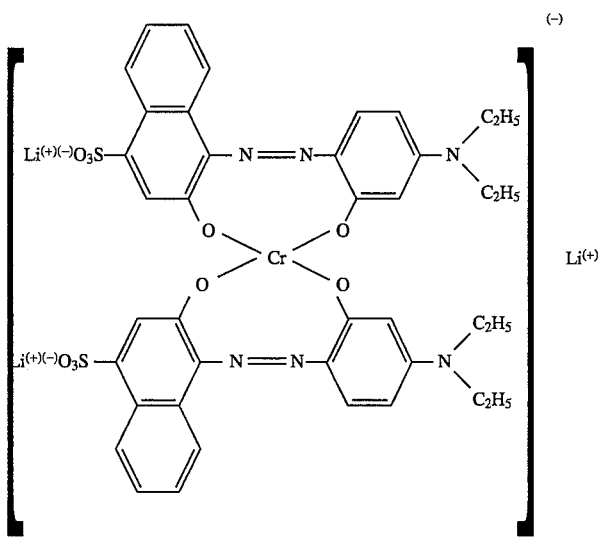

1 mol of 1-diazo-2-naphthol-4-sulphonic acid is dissolved in 1200 ml of water by addition of about 250 ml of 5N sodium hydroxide solution. In another apparatus which from this point on is kept under nitrogen, 1 mol of 3-diethylaminophenol is introduced into a solution of 37 g of LiOH.H$_2$O in 320 ml of water which has been heated to 50° C. After a short period, this gives again a solution to which, after being cooled to 30° to 25° C., the solution of the 1-diazo-2-naphthol-4-sulphonic acid is added at this temperature over a period of one hour. After additional stirring for about one hour, coupling is complete. The coupling yields about 97% of theory.

116 g of basic chromium(III) acetate (33% by weight of Cr$_2$O$_3$) are then added. The mixture is then, it being possible for the nitrogen stream to be turned off at this point, heated to 100° C. and maintained at this temperature for about two hours until analysis by thin-layer chromatography shows that chroming of the starting dyestuff is complete. After cooling the mixture to 50° C., the pH is brought to 7.0 with about 50 g of LiOH.H$_2$O.

The 1:2 chromium complex dyestuff can be obtained from the resulting solution by spray-dyeing as a black powder which dyes wool, polyamide and leather in blue shades. On the other hand, the solution can be desalted and concentrated by subjecting it to ultrafiltration and converted to a stable liquid brand by addition of 10 to 30% by weight of ethylglycol or 1-ethoxy-2-propyl. In this case, dip- or spray-dyeing also produces blue leather dyeings having good fastness properties.

Examples 16 to 21

The procedure as described in Example 15 is repeated, except that the diazonaphthol derivatives listed in Table 2 below and the coupling components next to them are used, to give further blue 1:2 chromium complex dyestuffs which can be used for the applications mentioned in Example 15.

| Ex. No. | Diazonaphthol | Coupling component |
|---|---|---|
| 16 | 1-diazo-2-hydroxy-4-sulfonate naphthalene | 3-(dimethylamino)phenol |
| 17 | 1-diazo-2-hydroxy-4-sulfonate naphthalene | 3-(dipropylamino)phenol |
| 18 | 1-diazo-2-hydroxy-4-sulfonate naphthalene | 3-(phenylamino)phenol |
| 19 | 1-diazo-2-hydroxy-4-sulfonate naphthalene | 3-(2-methylphenylamino)phenol |
| 20 | 1-diazo-2-hydroxy-6-nitro-4-sulfonate naphthalene | 3-(dimethylamino)phenol |
| 21 | 1-diazo-2-hydroxy-6-nitro-4-sulfonate naphthalene | 3-(diethylamino)phenol |

Example 22

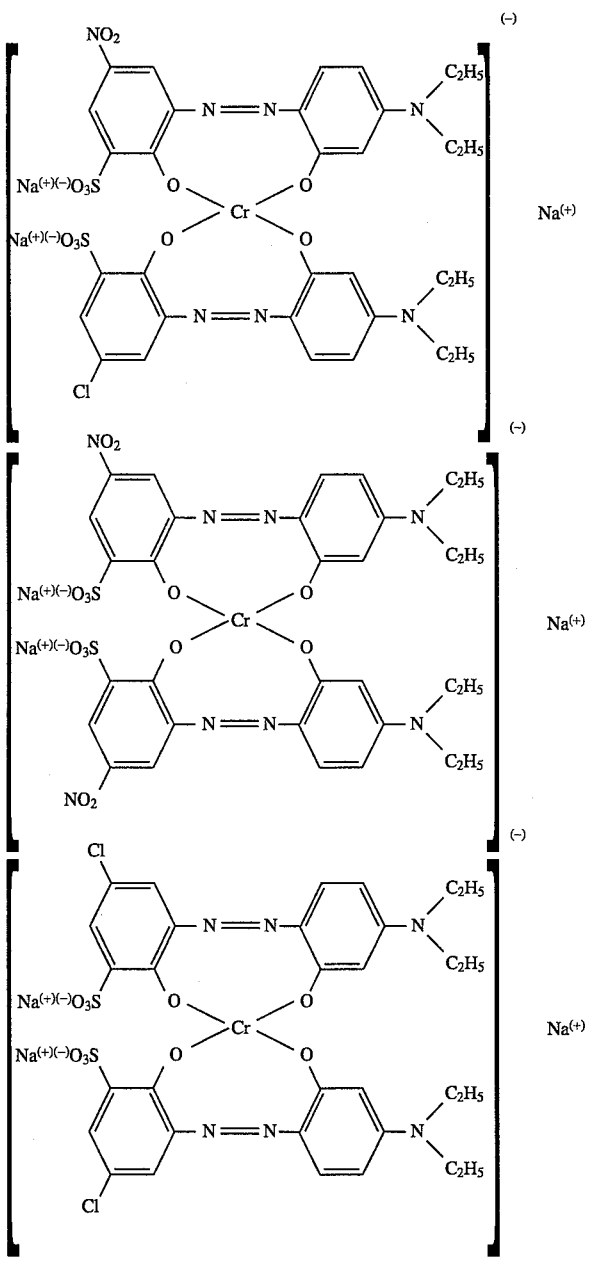

0.1 mol each of the two azo dyestuffs obtained from diazotized 4-nitro-2-aminophenol-6-sulphonic acid and 3-diethylaminophenol as the coupling component and from diazotized 4-chloro-2-aminophenol-6-sulphonic acid and the same coupling component are mixed with one another in 500 ml of water by stirring. 23 g of basic chromium(III) acetate (33% by weight of $Cr_2O_3$) are added, the mixture is heated to 100° C., and stirring at this temperature is continued for about 2 hours until none of the two starting compounds can be detected any longer in the thin-layer chromatogram. After cooling to 60° C., the solution obtained is brought to a pH of 7.0 by dropwise addition of about 24 ml of 5N sodium hydroxide solution and evaporated to dryness on a water bath. The dry residue is ground to give a black powder which produces violet dyeings on wool, polyamide and leather.

Examples 23 to 32

Mixtures of other valuable 1:2 chromium complex dyestuffs are obtained by joint chroming of two azo dyestuffs in accordance with the procedure described in Example 22, if the starting materials used are the metallizable dyestuffs (1) and (2) of Table 3 below. In general, the dyestuffs are used in equimolar amounts. However, the molar ratio can also vary within the limits from 2:1 to 1:2 without having any great effect on the end producte. The hue of the metallized products when used for dyeing on leather, wool and polyamide can be seen from the last column of the table.

TABLE 3
| Ex. No. | Dyestuff (1) | Dyestuff (2) | Hue |
|---|---|---|---|
| 23 | 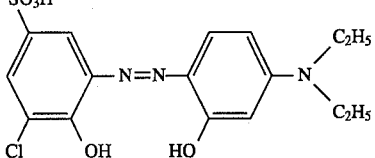 | 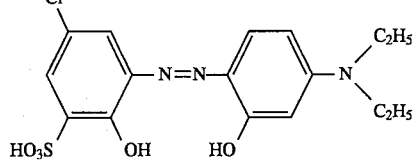 | violet |
| 24 | 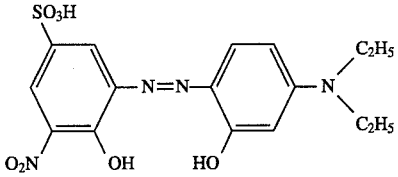 | 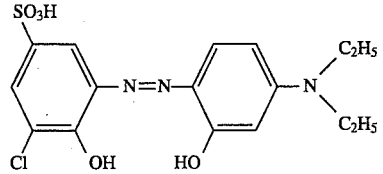 | violet |
| 25 | 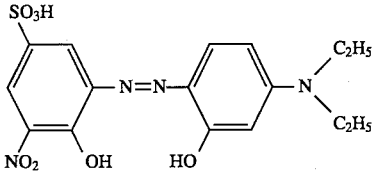 | 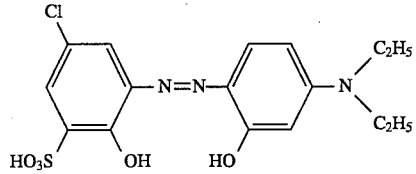 | violet |
| 26 | 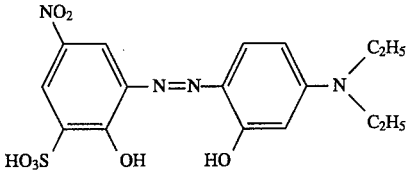 | 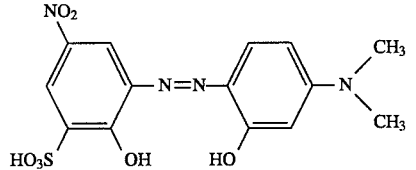 | bordeaux |
| 27 | 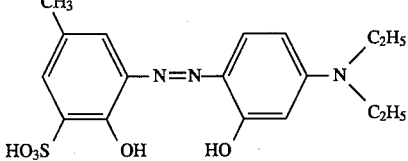 | 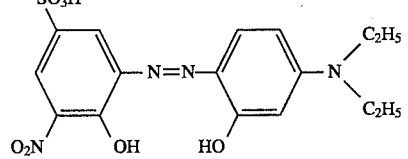 | violet |
| 28 | 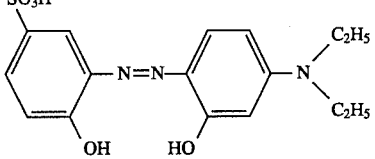 | 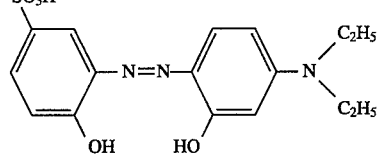 | bordeaux |
| 29 | 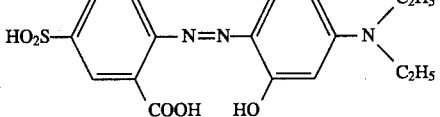 | 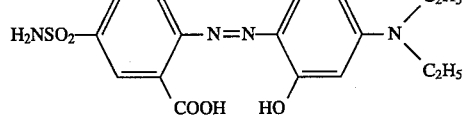 | brownish bordeaux |
Example 30
0.1 mol of the blue 1:2 chromium complex dyestuff of the formula

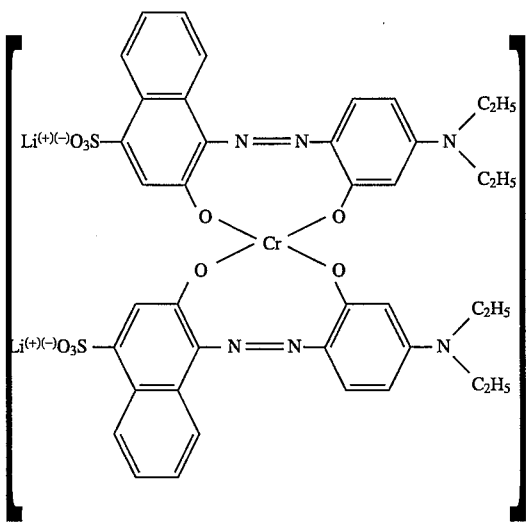

and 0.16 mol of the yellow 1:2 chromium complex dyestuff of the formula

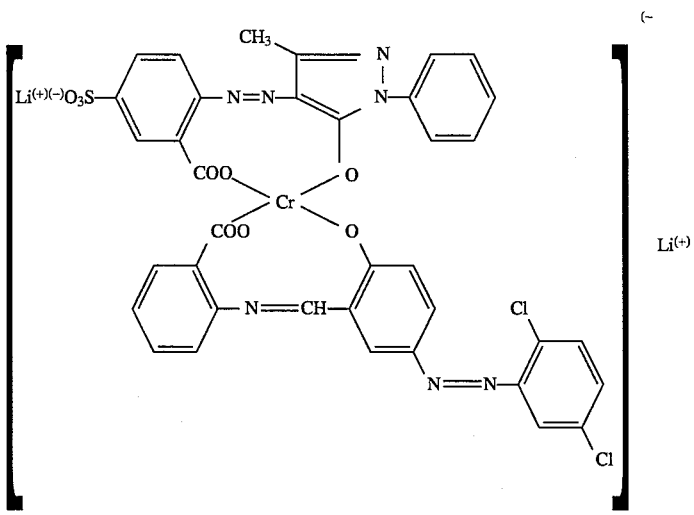

are dissolved in one liter of water and 400 ml of 1-ethoxypropanol at 50° C. The mixture is allowed to cool to room temperature and filtered through a paper filter to give a dark green concentrated and storage-stable dyestuff solution. In drum-, dip- or spray-dyeing, this solution produces on leathers of various tannages uniform olive-green dyeings which, with respect to one another, exhibit in no case a significant yellow or blue shift.

Example 31

0.1 mol of the brown 1:2 chromium complex dyestuff of the formula

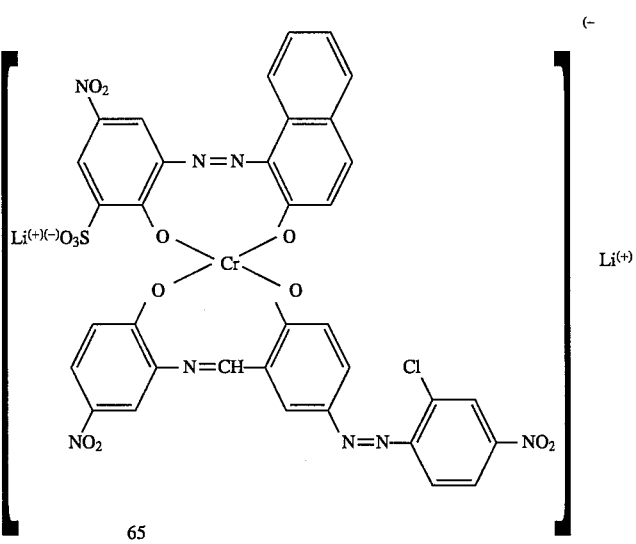

and 0.5 mol of the blue 1:2 chromium complex dyestuff of the previous Example 30 are dissolved in 900 ml of water and 400 ml of 1-ethoxy-2-propanol by heating at 50° C. The black concentrated solution obtained after clarification at room temperature has a shelf life of several months. When used for the applications mentioned in Example 30, it produces on Leathers of various tannages dyeings having good fastness properties in black-brown shades which from dyeing to dyeing are also very uniform.

I claim:

1. A 1:2 chromium complex dyestuff of the formula (I)

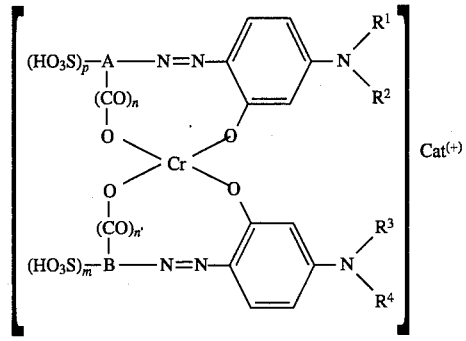

in which

A and B, independently of one another, represent the radical of a benzene or naphthalene ring each of which is further substituted or unsubstituted, the complexing group being in each case in the o position relative to the azo group, and $R^1$, $R^2$, $R^3$ and $R^4$ represent ethyl, n, n', p and m, independently of one another, are 0 or 1, the sum of p and m being 1 or 2, and $Cat^{(+)}$ represents a cation.

2. A symmetrical 1:2 chromium complex dyestuff according to claim 1 of the formula (II)

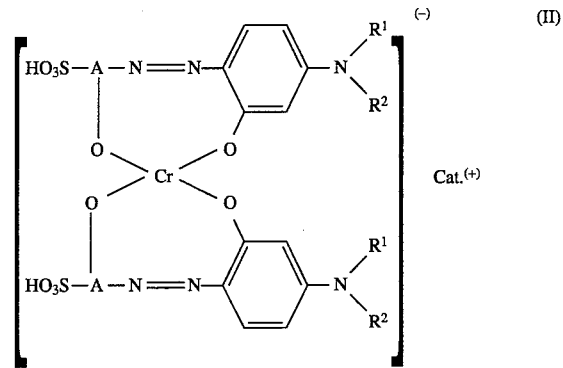

in which $R^1$, $R^2$, A and $Cat^{(+)}$ have the meaning given in claim 1.

3. A dyestuff according to claim 1 of the formula (I) in which the rings A and B are further unsubstituted or are substituted by acylamino, alkyl, alkoxy, sulphamoyl which is unsubstituted or mono- or disubstituted by alkyl or aryl, arylsulphonyl, Cl or $NO_2$.

* * * * *